United States Patent [19]

Schickedanz

[11] 4,389,536

[45] Jun. 21, 1983

[54] RECEIVER FOR A TWO CHANNEL TELEVISION SOUND

[76] Inventor: Willi Schickedanz, Langener Strasse 70, 6050 Offenbach am Main, Fed. Rep. of Germany

[21] Appl. No.: 190,639

[22] Filed: Nov. 10, 1980

[51] Int. Cl.³ .............................................. H04N 5/60
[52] U.S. Cl. ................. 179/1 G; 179/1 GM; 358/198
[58] Field of Search ............... 179/1 G, 1 GB, 1 GC, 179/1 GM; 307/529; 358/144, 198

[56] References Cited

U.S. PATENT DOCUMENTS 3,068,321 12/1962 Fremont et al. .................. 179/1 GB
3,573,382 4/1971 Feit et al. .......................... 179/1 GM
4,146,747 3/1979 Numata et al. .................. 179/1 GM
4,272,788 6/1981 Ogita ................................. 179/1 GC

FOREIGN PATENT DOCUMENTS 2902933 7/1980 Fed. Rep. of Germany ...... 358/144

Primary Examiner—A. D. Pellinen
Attorney, Agent, or Firm—Jacobson & Johnson

[57] ABSTRACT

A decoder in a receiver for a two channel television sound comprises an adder and a subtractor for decoding a m.(L+R)-information on a first channel and a 2mR-information on a second channel into the right and left stereo signals. This decoder is also capable of receiving two mono signals for a bilingual transmission.

11 Claims, 11 Drawing Figures

RECEIVER FOR A TWO CHANNEL TELEVISION SOUND

BACKGROUND OF THE INVENTION

1. Field of the Invention

This invention relates to a receiver for a two channel television sound.

More particularly, the invention relates to a receiver being capable of receiving a stereo sound signal which comprises a first channel and a second channel, the first channel including a m(L+R)-information and the second channel including a 2mR-information, wherein R is the "right" information and L the "left" information and m any real number.

The invention also relates to a receiver being capable of receiving stereophonic as well as bilingual informations.

2. The Prior Art

Multiplexing of a second sound channel with that one usually existing in broadcasting or the multiplex transmission of TV sounds is not only useful for bilingual transmission, but also for the transmission of a stereophonic sound. Consequently, various multiplexing systems have been proposed. Some of these systems transmit a (L+R)-channel as well as a (L−R) channel, as it is common practice in audio stereophony (see: Yasutaka Numaguchi: Television Sound Multiplexing System, Journal of the asia electronics union, Vol. 3, 1970, No. 2, p. 12–21). In another stereophonic television sound transmission system different combinations of the left and right signals have been described (see: Halstead and Burden: A compatible FM Multiplex System for Stereophonic Television Service, Journal of the Audio Engineering Society, January 1962, Vol. 10, Nr. 9, p. 16–21; U.S. Pat. No. 4,048,654, col. 17, lines 5–60; U.S. Pat. No. 4,139,866, col. 17, lines 15–35). Also, in AM stereophonic broadcasting, further different combinations of the left and the right information were disclosed (see: Torick: AM stereophonic Broadcasting—An Historical Review, Journal of the Audio Engineering Society, Vol. 23, 1975, p. 803, left column).

An inherent disadvantage of all these systems lies in the fact that the correlated noise, preferably occuring with the intercarrier demodulation in a FM television signal, is distributed asymmetrically on the two channels.

To overcome this disadvantage, a method for transmitting stereophonic signals on two equivalent channels has been proposed, particularly for a two-carrier system in the television sound, whereby on the first channel a L+R-signal and on the second channel a 2R-signal is transmitted (see: Rundfunktechnische Mitteilungen, Vol. 23, No. 1, February 1979, p. 10–13; German Auslegeschrift No. 2827159). A receiver for receiving this stereophonic signal comprises a decoder having two inputs, the one of these inputs being supplied with the L+R-signal and the other being supplied with the 2R-signal. The 2R-signal is amplified by the factor 0,5 and then subtracted from L+S. Thus, the signals L and R, respectively, are obtained, each of these signals including the same amount of correlated noise.

In another device for receiving stereophonic signals on two equivalent channels, the one channel carries a ½ (L+R)-information, whereas the other channel carries a R-information (German Offenlegungsschrift No. 29 02 933 corresponding to European Patent Application No. 80 10 021.9). The signal ½ (L+R) is first amplified by the factor 2 and then supplied to a subtractor which subtracts the signal R from the signal L+R, so that the signal L results. Also, a switch is provided which either connects the R-input with the subtractor for stereophonic reproduction or the ½ (L+R)-input with said subtractor for reproduction of a second language in a bilingual program.

A disadvantage of these prior art decoders is the necessity of an amplification of the received signals, either by a degree of amplification of 0,5 or by a degree of amplification of 2. Still, if the amplification rate is 0,5, an amplifier must be inserted into the right channel, whereas the subtractor is interposed in the left channel. Also, the prior art decoders are not capable of distinguishing automatically between a stereo signal and a bilingual signal.

SUMMARY OF THE INVENTION

It is a general object of the invention to overcome the disadvantages of the prior art.

More particularly, it is an object of the invention to separate the combined left and right channel signals of a stereo transmission information into a right and left stereo signal.

Another object of the invention is to separate a m(L+R)-channel-signal and a 2mR-channel-signal into the left channel signal L and the right channel signal R or into a multiple or fraction thereof.

A concomitant object of the invention is to separate the combined left and right signals into the mere left and right signals by means of one adder and one subtractor only and by omitting an amplifier.

Still a further object of the invention is to receive bilingual signals by means of switching a decoder from one state into another.

Finally, it is an object of the invention to automatically detect whether a stereo signal or a bilingual signal is transmitted and to control switch means of a decoder accordingly.

BRIEF DESCRIPTION OF THE DRAWINGS

For a fuller understanding of the invention, reference is had to the following description taken in connection with the accompanying drawings, in which.

Figure 1A:
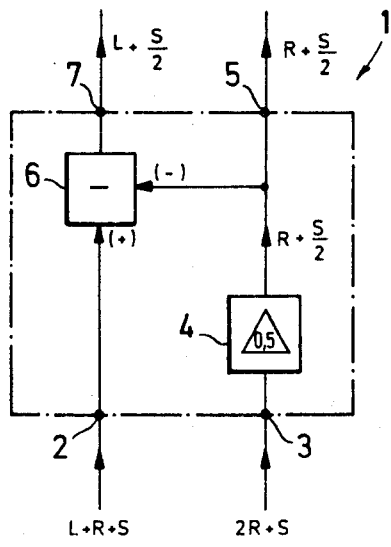
FIG. 1a is a prior art decoder having a 0,5-amplification with respect to one input signal.

The prior art decoder 1 as shown in FIG. 1a receives on its left input 2 a L+R-signal and on its right input 3 a 2R-signal. To these signals a correlated noise S is added. The right signal 2R+S is supplied to an amplifier 4 which amplifies the signal by the factor 0,5; i.e. at the output of said amplifier 4 a signal R+S/2 occurs. This signal is conducted to the output 5 of the decoder and then forwarded to processing devices not shown in the drawings.

The left L+R+S-signal is led to a subtractor 6 subtracting the output signal of the amplifier 4 from the left input signal. The result of this operation, i.e. L+S/2, is fed to the output 7 of the decoder 1, from where it can be forwarded to processing devices in the usual manner. Thus, the correlated noise S is distributed equally on both output signals L+S/2 and R+S/2. Further details are described in German Auslegeschrift No. 28 27 159.

Figure 1B:
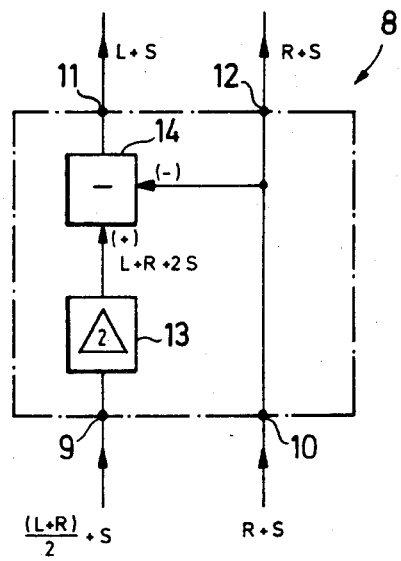
FIG. 1b is another prior art decoder with a 2-amplification with respect to one input signal.

FIG. 1b depicts a different decoder being described in German Offenlegungsschrift No. 29 02 933, corresponding to European Patent Application No. 80 10 0219. This decoder comprises two inputs 9,10 and two outputs 11,12, the input signals being (L+R)/2 and R+S, respectively, and the output signals being L+S and R+S. The symmetrical distribution of the correlated noise on both outputs is achieved by an amplifier 13 which amplifies the (L+R)/2+S by the factor two, and by a subtractor 14 which subtracts the input signal R+S from the output signal L+R+2S of the amplifier 13.

Figure 1C:
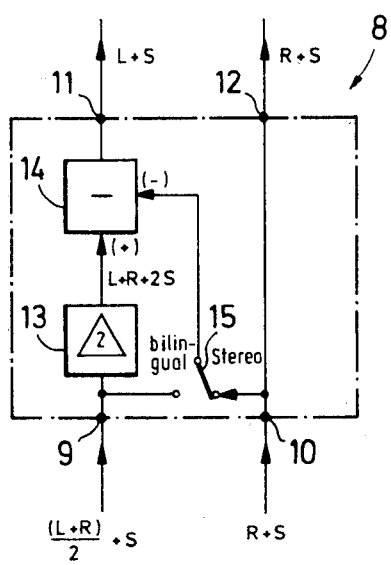
FIG. 1c is a prior art decoder as illustrated in FIG. 1b, comprising switching means being capable of switching from a stereo operation to a bilingual operation and vice versa.
Figure 1D:
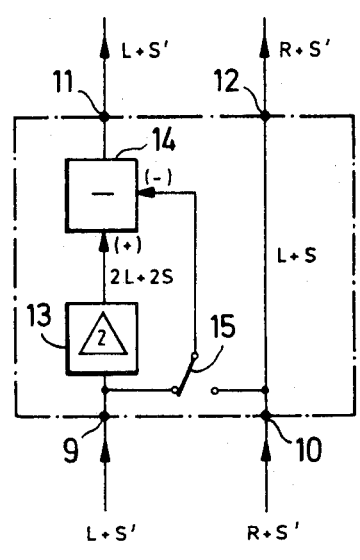
FIG. 1d is a prior art decoder as illustrated in FIG. 1c, the switching means being in the bilingual position.

FIG. 1c depicts a decoder as shown in FIG. 1b, said decoder being capable of receiving stereo sound signals as well as bilingual signals. For this twofold operation a switch 15 is provided which connects the minus input of the subtractor 14 to the input 10 of the decoder 8 in a first switching state and to the input 9 in a second switching state. FIG. 1c illustrates the information flow when a stereo signal is being received, whereas FIG. 1d depicts the information flow for a bilingual transmission; i.e. when, for instance, a TV film is broadcasted in the original language and in a foreign language as well. In that case both languages are transmitted on different mono channels and need not be separated by a decoder into a left and a right signal. Consequently, it is adequate to connect through the inputs 9,10 and the outputs 11,12, respectively.

Figure 2A:
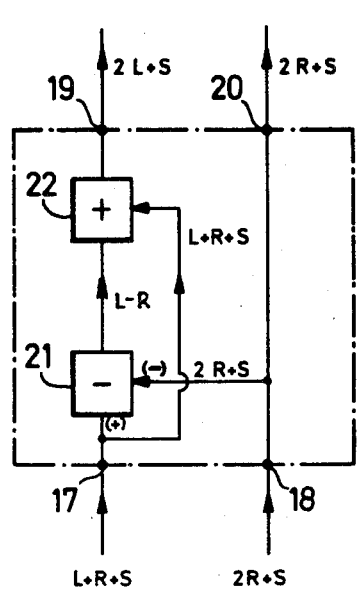
FIG. 2a is a decoder according to the present invention, this decoder receiving a L+R-signal as well as a 2R-signal.

FIG. 2a depicts a decoder 16 according to the present invention, this decoder having two inputs 17,18 and two outputs 19,20. The left signal L+R+S is supplied to a subtractor 21 subtracting the right signal 2R+S from said left signal. The result of this subtraction, the signal L−R, is fed to an adder 22 which adds the left signal L+R+S to the output signal L−R of the subtractor 21. Thus, the signal 2L+S appears at the output of the adder 22 and is then forwarded to the output 19 of the decoder 16. Since the right input 18 is connected to the output 20 of the decoder 16, the right signal 2R+S appears unchanged at the output 20.

It will be understood that the correlated noise is symmetrically distributed on both output signals, although the circuit of FIG. 2a does not comprise an amplifier for amplifying one of the input signals.

Figure 2B:
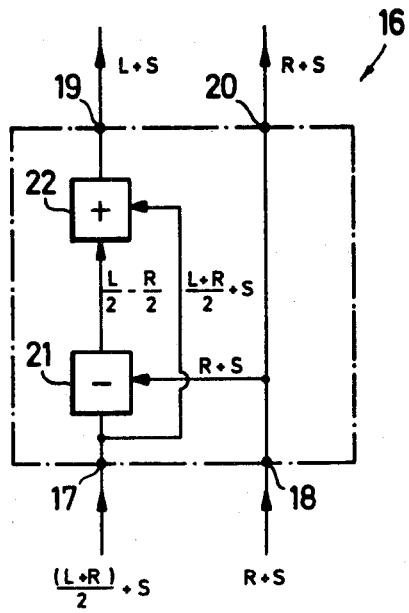
FIG. 2b is a decoder as illustrated in FIG. 2a, this decoder receiving (L+R)/2- as well as R-signals.

FIG. 2b illustrates a decoder corresponding to the decoder of FIG. 2a. The signals being received at the inputs of said decoder 16, however, correspond to the signals shown in FIG. 1b. Thus, the right channel signal R+S is subtracted from the left channel signal (L+R)/2+S, and the result, i.e. (L−R)/2, of this operation is fed to the adder 22 which adds the signal (L+R)/2+S to the signal (L−R)/2. Therefore, the signal L+S appears at the output 19 of the decoder 16. In this case, too, the correlated noise is distributed symmetrically on both output signals.

Figure 2C:
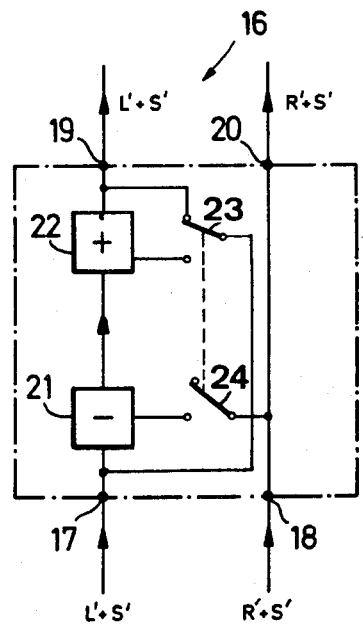
FIG. 2c is a decoder according to the present invention comprising switch means and receiving two separate signals for a first and a second language.

FIG. 2c depicts the same decoder as shown in FIGS. 2a and 2b. In addition, however, it includes switching means being capable of switching from a stereo receiving state to a bilingual transmission receiving state and vice versa. This switching means comprise two switches 23,24, the one switch 23 connecting either the output of the adder 22 and the input 17 of the decoder 16 or the negative input of the adder 22 to said input 17, and the other switch 24 establishing or disrupting the connection from the negative input of the subtractor 21 to the input 18 of the decoder 16. It will be apparent from FIG. 2c that the switches 23,24 as shown in FIG. 2c are connecting through the input signals to the respective outputs 19, 20 of the decoder 16.

Figure 2D:
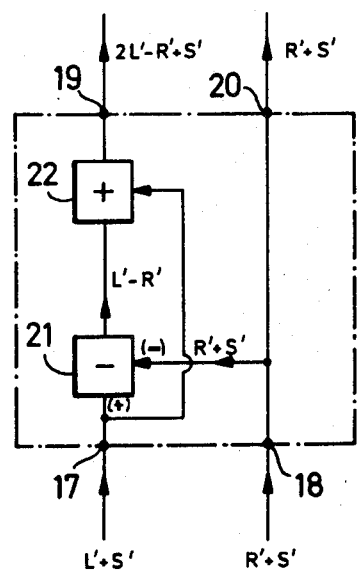
FIG. 2d depicts, for a better understanding of the principle of the present invention, a decoder as illustrated in FIGS. 2a and 2b, whereby the two separate language informations are processed as if they were stereo signals.

FIG. 2d illustrates how the decoder 16 would work if no switch means were provided and if bilingual mono signals were received. Since the right channel signal R'+S is connected to the output 20, it would be possible to reproduce one language, e.g. the mother language of the user of the TV set. The signal 2L'−R'+S resulting at the output 19, however, cannot be used for the reproduction of the second language.

On the connection line connecting the subtractor 21 and the adder 22, a signal L'−R' appears which is formally similar to the signal L−R in FIG. 2a. In view of the fact, however, that the L and R signals of a stereo signal have, in general, some information in common, the difference between both signals is smaller than the corresponding difference of two independent mono signals. Thus, the difference of L−R and L'−R', respectively, indicates whether a stereo or a bilingual signal is being received.

Figure 3:
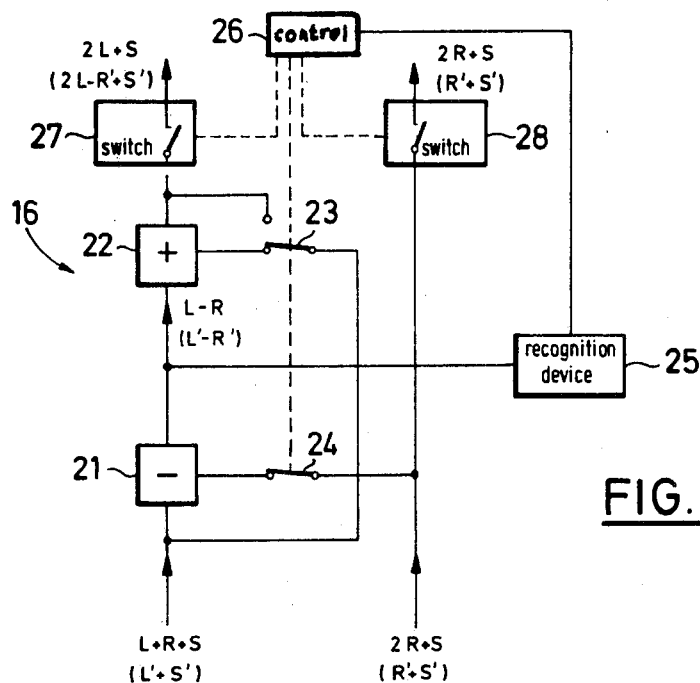
FIG. 3 is a decoder as illustrated in FIG. 2c in its stereo receiving state, the switching means of said decoder being controlled by means being capable of distinguishing between a stereo signal and a two channel signal.

FIG. 3 depicts a decoder 16 comprising a recognition device 25 being capable of evaluating whether the signal at the output of the subtractor 21 stems from a stereo signal or from a bilingual signal.

According to the decision of the device 25 a switching control means 26 is actuated which controls the switches 23,24 accordingly. If a bilingual transmission was detected by the recognition device 25, either a switch 27 or a switch 24 or both can be actuated, so that the first language can be reproduced by a first loudspeaker and the second language by a second loudspeaker or that only one language is reproduced, e.g. the mother language of the user or the foreign language.

Figure 4:
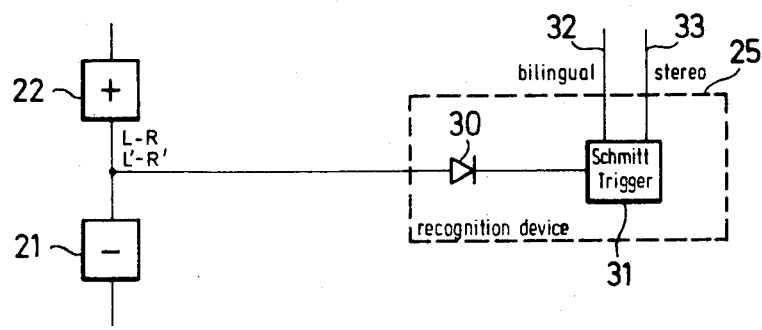
FIG. 4 depicts means for distinguishing between stereo signals and two mono signals more in detail.

FIG. 4 illustrates the stereo/mono-detector-device 25 in detail. The information L−R and L'−R', respectively, is rectified by a rectifier 30 which is connected to a threshold unit, e.g. a Schmitt-Trigger 31. If the threshold of this Schmitt-Trigger 31 is passed by the signal coming from the rectifier 30, this will indicate that a bilingual signal is being received. On the other hand, if the threshold is not passed, this will indicate that a stereo signal is being received. The respective lines 32,33 are connected to the device 26.

Figure 5:
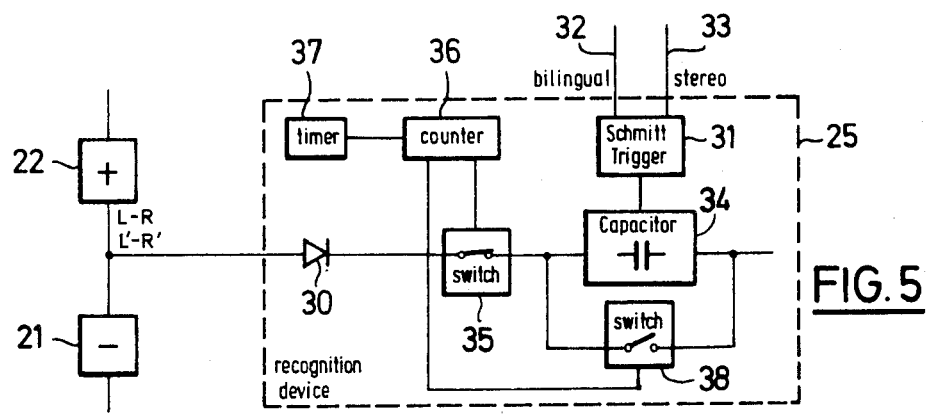
FIG. 5 depicts another means for distinguishing stereo signals and two mono signals.

To avoid errors which could appear by using a Schmitt-Trigger only, said errors being caused by the fact that the actual voltage is sensed and not the voltage over a given time, an integrator of the voltage can be provided so as to take into consideration that under certain circumstances the difference between the L and R signal of a stereo information can be very great. As is shown in FIG. 5, the voltage of the rectifier 30 is led via a switch 35 to an integrator, e.g. capacitor means 34, this integrator being arranged in parallel to a threshold detector 31, e.g. a Zener diode or a Schmitt-Trigger. The integrator 34 is summing up the voltage at the output of the rectifier 30, if it is connected to this output, i.e. if the switch 35 is closed by means of a counter 36 which is operated by a timer 37. The timer 37 causes the counter 36 to count from a first state up to a second state, the difference between the two states being a measure for the summing time. From its second state the counter 36 again begins to count from its first state, i.e. the counter 36 is a circulating counter which counts from one number via several other numbers up to a last number and then begins with the first number again. Assuming now that the switch 35 is closed by the counter 36, the integrator begins to integrate the voltage at the output of the rectifier 30. When the counter 36 has reached its last counting state within one counting cycle, switch 35 will be opened and switch 38 will be closed. If the voltage at the output of the integrator 34 has passed within said cycle the threshold of the threshold detector 31, this indicates the existence of a bilingual program. If, however, this threshold was not passed, a stereo program is being received.

At the end of one counting cycle the integrator is discharged by closing switch 38. At the same time switch 35 will be opened. Now a new counting cycle may begin.

It goes without saying that it is possible to modify the recognition circuit for detecting mono and/or stereo signals. Since the left input stereo signal L+R+S includes the right as well as the left channel information, whereas the left mono or bilingual signal L'+S' does not comprise a right channel information, it is possible to distinguish between the two signals by means of an autocorrelator as it is known in the art of noise suppression. Also, if the input signals are added, the sum of the stereo signal is L+3R+S, whereas the sum of the bilingual signal is L'+R'+S', i.e. the signal 3R dominates in the stereo signal, so that the rest L+S can be treated as noise in the sense of the autocorrelation method.

Moreover, it is easy for those skilled in the art to connect the output lines having the signals 2L+S and 2R+S (FIG. 3) with loudspeakers in any useful manner, whereby said loudspeakers can be arranged as, for instance, described in German Auslegeschrift No. 29 02 819.

Those skilled in the art are also able to design circuits as described in connection with block diagrams. Those circuits, e.g. adders, subtractors and the like, are disclosed in many articles and books (TIETZE/-SCHENK: Halbleiter-Schaltungstechnik, 5th edition, 1980, p. 189–194, 222–235).

What I claim is:

1. In a receiver for receiving TV sound signals, said sound signals being transmitted by means of a first and a second channel:
   (a) decoder means having a first and a second input as well as a first and second output, the first input being supplied with the signal of the first channel and the second input being supplied with the signal of the second channel;
   (b) subtractor means for subtracting the signal of the second input of the decoder from the signal of the first input of said decoder;
   (c) adder means for adding the output signal of the subtractor means to the signal of the first input of the decoder;
   (d) means for connecting the output of the adder means to the first output of the decoder and
   (e) means for connecting the second input of the decoder to the second output of said decoder.

2. In a receiver as defined in claim 1, the signal on the first channel being a m(L+R)-signal, wherein m is a real number and "L" means a "left" signal and "R" a "right" signal, and the signal on the second channel being a 2m(R)-signal, wherein m is a real number and wherein "R" means a "right" signal.

3. In a receiver as defined in claim 1, the subtractor means and the adder means being series connected between the first input and the first output of the decoder.

4. In a receiver as defined in claim 1, wherein the means for connecting the second input of the decoder to the second output of said decoder is a direct connecting path.

5. In a receiver as defined in claim 1, wherein switching means are provided, said switching means being capable of connecting—in a first switching state—the second input of the decoder to the subtractor means as well as the first input of said decoder to the adder and—in a second switching state—the first input of said decoder to the first output of said decoder.

6. In a receiver as defined in claim 5, wherein the first switching state corresponds to a m(L+R) signal on the first channel and a 2mR-signal on the second channel and wherein the second switching state corresponds to a nL'-signal on the first channel and a nR'-signal on the second channel, wherein n is a real number and wherein R' means a "right" signal, whereas "L" means a "left" signal.

7. In a receiver as defined in claim 1, further including means for distinguishing between stereo signals and mono signals.

8. In a receiver as defined in claim 7, wherein said means for distinguishing stereo signals and mono signals are connected to switching means.

9. In a receiver as defined in claim 7, wherein said means for distinguishing stereo signals and mono signals are connected to the output of the subtractor means.

10. In a receiver as defined in claim 7, wherein said means for distinguishing stereo and mono signals comprise a threshold means.

11. In a receiver as defined as claim 7, wherein said means for distinguishing stereo and mono signals comprise a timer being connected to a counter which controls a first and a second switching means, whereby said switching means are controlled by said counter in such a manner that an integrator is supplied—for a defined space of time—with the output signals of the subtractor means, and whereby a threshold means is actuated when the signal integrated by an integrator passes a given threshold within said space of time.

* * * * *